United States Patent
Won

(10) Patent No.: US 11,955,840 B2
(45) Date of Patent: Apr. 9, 2024

(54) STATOR AND MOTOR COMPRISING SAME

(71) Applicant: LG INNOTEK CO., LTD., Seoul (KR)

(72) Inventor: Il Sik Won, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 566 days.

(21) Appl. No.: 17/264,155

(22) PCT Filed: Jul. 8, 2019

(86) PCT No.: PCT/KR2019/008337
§ 371 (c)(1),
(2) Date: Jan. 28, 2021

(87) PCT Pub. No.: WO2020/040424
PCT Pub. Date: Feb. 27, 2020

(65) Prior Publication Data
US 2021/0234413 A1 Jul. 29, 2021

(30) Foreign Application Priority Data
Aug. 21, 2018 (KR) .......................... 10-2018-0097600

(51) Int. Cl.
*H02K 3/38* (2006.01)
*H02K 1/04* (2006.01)
(Continued)

(52) U.S. Cl.
CPC ............... *H02K 1/04* (2013.01); *H02K 1/146* (2013.01); *H02K 1/165* (2013.01); *H02K 3/345* (2013.01);
(Continued)

(58) Field of Classification Search
CPC ............ H02K 5/22; H02K 3/335; H02K 1/04; H02K 1/146; H02K 1/165; H02K 3/345;
(Continued)

(56) References Cited

U.S. PATENT DOCUMENTS 7,126,246 B2 * 10/2006 Izumi ...................... H02K 3/18
310/180
7,626,303 B2 12/2009 Watanabe et al.
(Continued)

FOREIGN PATENT DOCUMENTS

CN 204216691 U 3/2015
DE 10 2012 020 329 A1 4/2014
(Continued)

OTHER PUBLICATIONS

English machine translation, Takemura et al. JP 2012075213. (Year: 2012).*
(Continued)

*Primary Examiner* — Burton S Mullins
(74) *Attorney, Agent, or Firm* — Saliwanchik, Lloyd & Eisenschenk

(57) ABSTRACT

An embodiment relates to a stator and a motor comprising same, the stator comprising: a stator core comprising a yoke and multiple teeth protruding from the inner surface of the yoke; an insulator surrounding a part of the stator core; a coil wound around the insulator; and a molding portion disposed to cover the stator core, the insulator, and the coil. The insulator comprises a first insulator and a second insulator. The first insulator comprises: a body portion around which the coil is wound; and inner guide extending from the inside of the body portion in the perpendicular direction; a first outer guide extending from the outside of the body portion in the perpendicular direction; a second outer guide disposed to be spaced apart from the first outer guide in the outward direction; and a protrusion protruding from the second outer guide in the inward direction. The protrusion has an end portion disposed such that a predetermined gap (G) is formed between same and the first outer guide. The coil has a part disposed between the first outer guide and the second outer guide through the gap (G). Accordingly, it is possible (Continued)

to inhibit the coil from contacting the housing due to injection molding pressure during over-molding of the stator.

11 Claims, 10 Drawing Sheets

(51) Int. Cl.
*H02K 1/14* (2006.01)
*H02K 1/16* (2006.01)
*H02K 3/34* (2006.01)
*H02K 5/22* (2006.01)
*H02K 15/02* (2006.01)
*H02K 15/08* (2006.01)
*H02K 15/09* (2006.01)
*H02K 15/12* (2006.01)

(52) U.S. Cl.
CPC ............... *H02K 3/38* (2013.01); *H02K 5/22* (2013.01); *H02K 15/024* (2013.01); *H02K 15/09* (2013.01); *H02K 15/12* (2013.01)

(58) Field of Classification Search
CPC ........ H02K 3/38; H02K 15/024; H02K 15/09; H02K 15/12
See application file for complete search history.

(56) References Cited

U.S. PATENT DOCUMENTS

| | | | | |
|---|---|---|---|---|
| 8,288,903 B2* | 10/2012 | Matsuda | ............... | H02K 3/522 310/43 |
| 9,685,844 B2* | 6/2017 | Nakamura | ............. | H02K 3/522 |
| 10,236,740 B2* | 3/2019 | Kimpara | ................... | H02K 3/30 |
| 10,374,479 B2* | 8/2019 | Lee | ..................... | H02K 3/522 |
| 10,644,561 B2* | 5/2020 | Abe | ........................ | H02K 3/32 |
| 2012/0286593 A1 | 11/2012 | Yokogawa et al. | | |
| 2015/0054377 A1 | 2/2015 | Kameyama et al. | | |
| 2018/0152071 A1* | 5/2018 | Masugi | ..................... | H02K 3/30 |
| 2020/0014271 A1* | 1/2020 | Ogawa | ................... | H02K 3/522 |

FOREIGN PATENT DOCUMENTS

| | | | | | |
|---|---|---|---|---|---|
| JP | 58-201565 | | * | 11/1983 | ............. H02K 3/345 |
| JP | 2003-333783 | A | | 11/2003 | |
| JP | 2006-149027 | A | | 6/2006 | |
| JP | 2008-167604 | A | | 7/2008 | |
| JP | 2010-239826 | A | | 10/2010 | |
| JP | 2011-205876 | A | | 10/2011 | |
| JP | 2012075213 | A | * | 4/2012 | ............... H02K 1/18 |
| JP | 2014-200131 | A | | 10/2014 | |
| JP | 2017-147882 | A | | 8/2017 | |
| KR | 10-2008-0078950 | A | | 8/2008 | |
| KR | 10-2011-0077819 | A | | 7/2011 | |
| KR | 10-2016-0139350 | A | | 12/2016 | |
| WO | WO 2018180638 | A1 | * | 10/2018 | ............. H02K 5/225 |

OTHER PUBLICATIONS

International Search Report dated Oct. 11, 2019 in International Application No. PCT/KR2019/008337.
Office Action dated Mar. 20, 2023 in Korean Application No. 10-2018-0097600.
Supplementary European Search Report dated Sep. 21, 2021 in European Application No. 19852601.4.
Office Action dated Jun. 20, 2023 in Japanese Application No. 2021-505988.

* cited by examiner

STATOR AND MOTOR COMPRISING SAME

CROSS-REFERENCE TO RELATED APPLICATIONS

This application is the U.S. national stage application of International Patent Application No. PCT/KR2019/008337, filed Jul. 8, 2019, which claims the benefit under 35 U.S.C. § 119 of Korean Application No. 10-2018-0097600, filed Aug. 21, 2018, the disclosures of each of which are incorporated herein by reference in their entirety.

TECHNICAL FIELD

The present invention relates to a stator and a motor including the same.

BACKGROUND ART

A motor is a device that converts electrical energy into mechanical energy to obtain rotational force and is widely used in vehicles, home electronics, and industrial equipment.

The motor may include a housing, a shaft, a stator disposed inside the housing, a rotor installed on an outer peripheral surface of the shaft, and the like. Here, the stator of the motor induces an electrical interaction with the rotor to induce the rotation of the rotor. The shaft also rotates according to the rotation of the rotor.

In particular, the motor can be used in a device for ensuring the stability of steering of a vehicle. For example, the motor may be used in a vehicle motor such as an electronic power steering system (EPS).

In addition, the motor can be used in a clutch actuator.

A transmission of the vehicle is a transmission that is manually operated according to a user's clutch operation or automatically operated according to a speed by the transmission and includes a motor.

Such motors can be disposed in environments exposed to fluids such as oil.

Thus, in the case of the stator of the motor, the stator of the motor may be manufactured by an injection method using a material such as a mold for insulation of the coil.

The stator may be formed by primary injection, by which an insulator is formed on a stator core, and by secondary injection by which a coil is wound around the insulator and then over-molding is performed.

However, when the secondary injection is performed, the coil wound around the insulator may be exposed by injection molding pressure. Thus, since the exposed coil may be in contact with the housing, there is a possibility of a short circuit.

Therefore, when the secondary injection is performed, a forming process is additionally performed to inhibit exposure of the coil, but, in the case of the forming process, a production cost may increase.

DISCLOSURE

Technical Problem

The present invention is directed to providing a stator that is capable of inhibiting exposure of a coil due to over-molding and a motor including the same.

The technical problem to be achieved by the present invention is not limited to the technical problems as described above, and other technical problems not described herein will be clearly understood by those skilled in the art from the following description.

Technical Solution

One aspect of the present invention provides a stator including: a stator core including a yoke and a plurality of teeth protruding from an inner surface of the yoke; an insulator surrounding a part of the stator core; a coil wound around the insulator; and a molding portion disposed to cover the stator core, the insulator, and the coil, wherein the insulator includes a first insulator and a second insulator, the first insulator includes a body portion around which the coil is wound, an inner guide extending from an inside of the body portion in a direction perpendicular thereto, a first outer guide extending from an outside of the body portion in a direction perpendicular thereto, a second outer guide disposed to be spaced apart from the first outer guide in an outward direction, and a protrusion protruding inward from the second outer guide, an end portion of the protrusion is disposed such that a predetermined gap (G) is formed between the end portion and the first outer guide, and a part of the coil is disposed between the first outer guide and the second outer guide through the gap (G).

A width (W1) of the protrusion in a radial direction may be 0.6 times or more of an outer diameter of the coil.

A width (W2) of the protrusion in a circumferential direction may be twice or more of the outer diameter of the coil.

The insulator may include a connection portion disposed between the first outer guide and the second outer guide, the connection portion may be disposed on the yoke, and a height (H) from the connection portion to the protrusion may be three times or more of the outer diameter of the coil.

The stator may further include a terminal connected to an end portion of the coil, wherein the second insulator includes a body portion around which the coil is wound, a first outer guide extending from an outside of the body portion in a direction perpendicular thereto, a second outer guide disposed to be spaced apart from the first outer guide in an outward direction, and an inner guide extending from an inside of the body portion in a direction perpendicular thereto, and a groove to which one side of the terminal is coupled is formed in an upper end of the inner guide.

The terminal may include a terminal body, a pin portion protruding from a top surface of the terminal body, a projection portion protruding from a bottom surface of the terminal body, and a bent portion formed by bending each of both sides of the terminal body, and the protrusion is coupled to the groove.

The second insulator may be disposed between three first insulators based on a circumferential direction.

The insulator may be disposed on the stator core by an injection method. The molding portion may be formed by an injection method in a state in which the coil is wound around the insulator.

Another aspect of the present invention provides a motor including: a shaft; a rotor that rotates in combination with the shaft; and a stator disposed outside the rotor, wherein the stator includes a stator core, an insulator surrounding a part of the stator core, a coil wound around the insulator, and a molding portion disposed to cover the stator core, the insulator, and the coil, and the insulator includes a first insulator and a second insulator, and the first insulator includes a body portion around which the coil is wound, an inner guide extending from an inside of the body portion in a direction perpendicular thereto, a first outer guide extending from an outside of the body portion in a direction perpendicular thereto, a second outer guide disposed to be spaced apart from the first outer guide in an outward direction, and a protrusion protruding inward from the second outer guide, and an end portion of the protrusion is disposed such that a predetermined gap (G) is formed between the end portion and the first outer guide, and a part of the coil is disposed between the first outer guide and the second outer guide through the gap (G).

After the insulator is primarily formed on the stator core by an injection method, the molding portion may be secondarily formed by an injection method in a state in which the coil is wound around the insulator.

A region of the coil may be between the first outer guide and the second outer guide.

Advantageous Effects

In a stator and a motor including the same according to embodiments having the above-described configuration, since a second outer guide and a protrusion protruding inward from the second outer guide are used, a coil can be inhibited from being exposed to the outside of a molding portion by injection molding pressure during over-molding.

Various and beneficial advantages and effects of the embodiments are not limited to the above description and may be more easily understood in the process of describing specific examples of the embodiments.

MODES OF THE INVENTION

Figure 1:
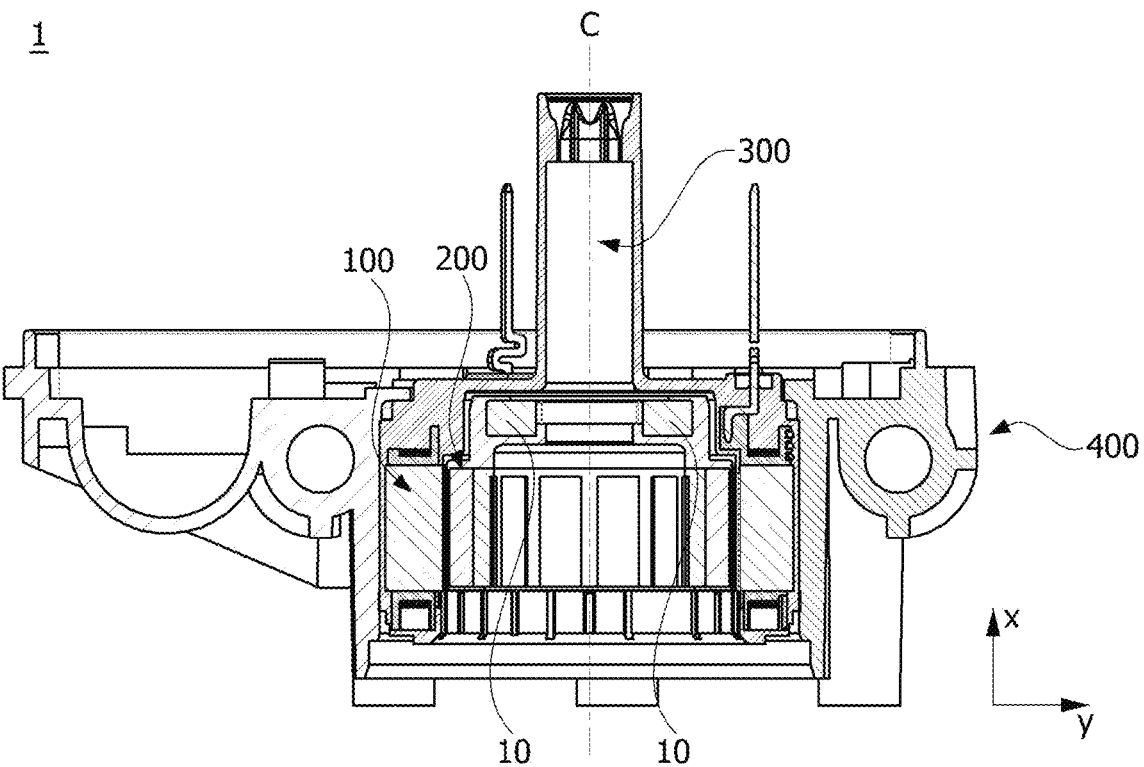
FIG. 1 is a view illustrating a motor according to an embodiment.

Hereinafter, exemplary embodiments of the present invention will be described in detail with reference to the accompanying drawings.

However, the technical idea of the present invention is not limited to some embodiments described herein but can be implemented in various forms, and when the embodiments are within the scope of the technical idea of the present invention, one or more of components between the embodiments may be selectively combined and substituted.

In addition, terms (including technical and scientific terms) used in the embodiments of the present invention may be interpreted in a sense that can be generally understood by those of ordinary skill in the art to which the present invention belongs, unless explicitly defined and described. The meaning of generally used terms, such as terms defined in a dictionary, may be interpreted in consideration of the meaning in the context of the related technology.

In addition, terms used in the embodiments of the present invention are for describing the embodiments and are not intended to limit the present invention.

In the present specification, the singular form may include the plural form unless specifically stated in the phrase, and when described as "at least one (or one or more) of A, B, and C", it may include one or more of all possible combinations with A, B, and C.

In addition, terms such as first, second, A, B, (a), and (b) may be used in describing the components of the embodiment of the present invention.

These terms are only for distinguishing the component from other components and are not limited to the nature, order, or order of the components by the term.

Further, when a component is described as being "connected," "coupled," or "linked" to another component, the component is not only directly connected, coupled or linked to another component, but also the component may also include the case of being "connected," "coupled," or "linked" to another component with still another component disposed therebetween.

In addition, when a component is described as being formed or disposed on the "top (upper) or bottom (lower)" of each component, the top (upper) or bottom (lower) includes the case where one or more other components are formed or disposed with still another component disposed therebetween as well as the case where two components are in direct contact with each other. In addition, when expressed as "top (upper) or bottom (lower)", the meaning of not only an upward direction but also a downward direction based on one component may be included.

Hereinafter, embodiments will be described in detail with reference to the accompanying drawings, but the same reference numerals are assigned to identical or corresponding components regardless of the reference numerals, and redundant descriptions thereof will be omitted.

FIG. 1 is a view illustrating a motor according to an embodiment. In FIG. 1, an x-direction represents an axial direction, and a y-direction represents a radial direction. The axial direction and the radial direction may be perpendicular to each other. Here, the axial direction may be a longitudinal direction of a shaft 300.

Referring to FIG. 1, a motor 1 according to the embodiment may include a stator 100 according to an embodiment, a rotor 200 disposed inside the stator 100, the shaft 300, and a housing 400. Here, the inside may refer to a direction toward the center C based on the radial direction, and an outside may refer to a direction opposite to the inside.

Also, the motor 1 may include a bearing 10 rotatably supporting the shaft 300.

The stator 100 and the rotor 200 induce an electrical interaction. When an electrical interaction is induced, the rotor 200 rotates, and the shaft 300 rotates in connection therewith. The shaft 300 may be connected to a clutch transmission to provide power. Furthermore, the shaft 300 may be connected to a dual-clutch transmission (DCT) to provide power. Here, the dual-clutch transmission (DCT) may be provided with two sets of clutches, unlike a single-plate clutch transmission mounted on a manual transmission vehicle according to the related art. Thus, the dual-clutch transmission (DCT) is a system that implements first, third, and fifth gears with power transmitted through one clutch, and second, fourth, and sixth gears with power transmitted through the other one clutch. The dual-clutch transmission (DCT) may selectively receive the power of the shaft 300.

As illustrated in FIG. 1, the stator 100 may be disposed outside the rotor 200.

Figure 2:
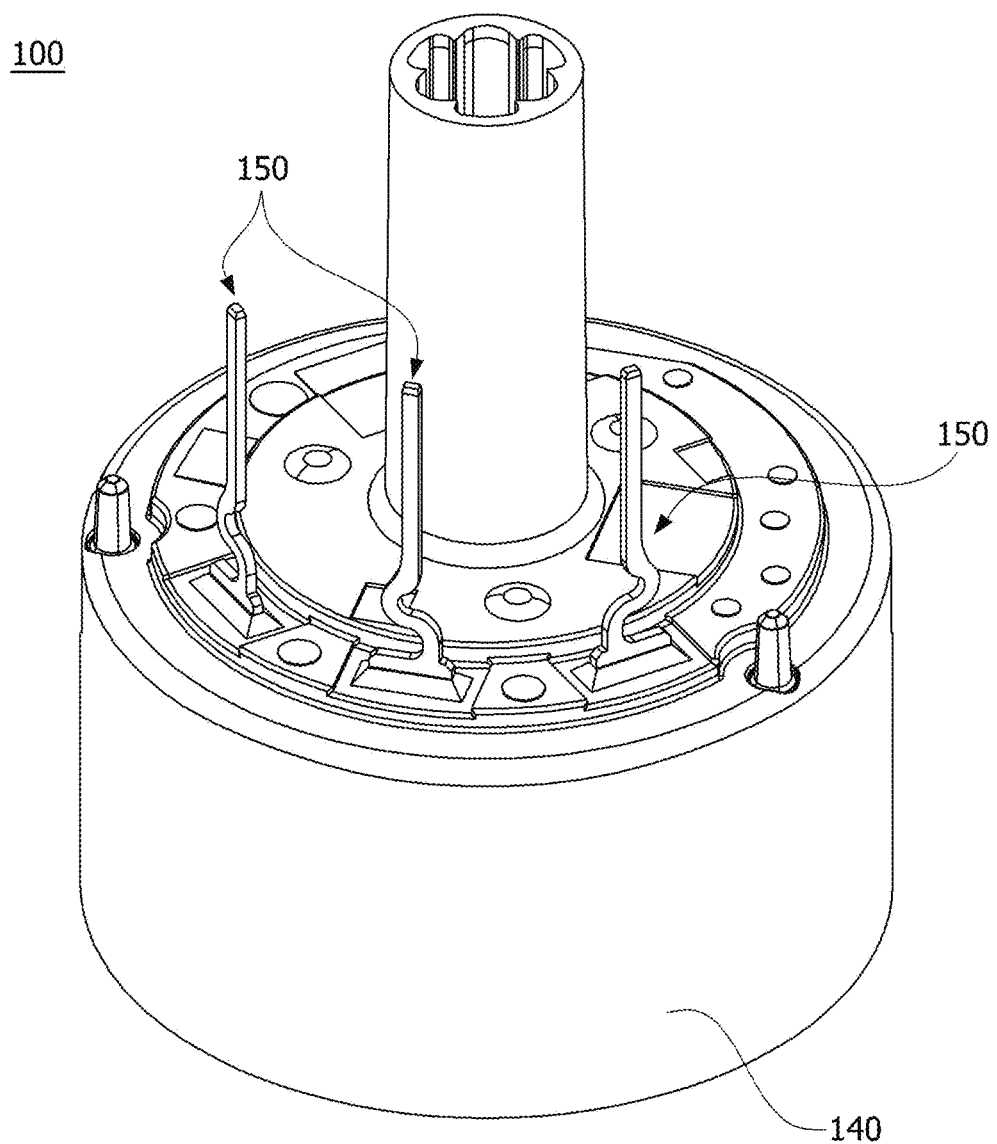
FIG. 2 is a perspective view illustrating a stator according to an embodiment.
Figure 3:
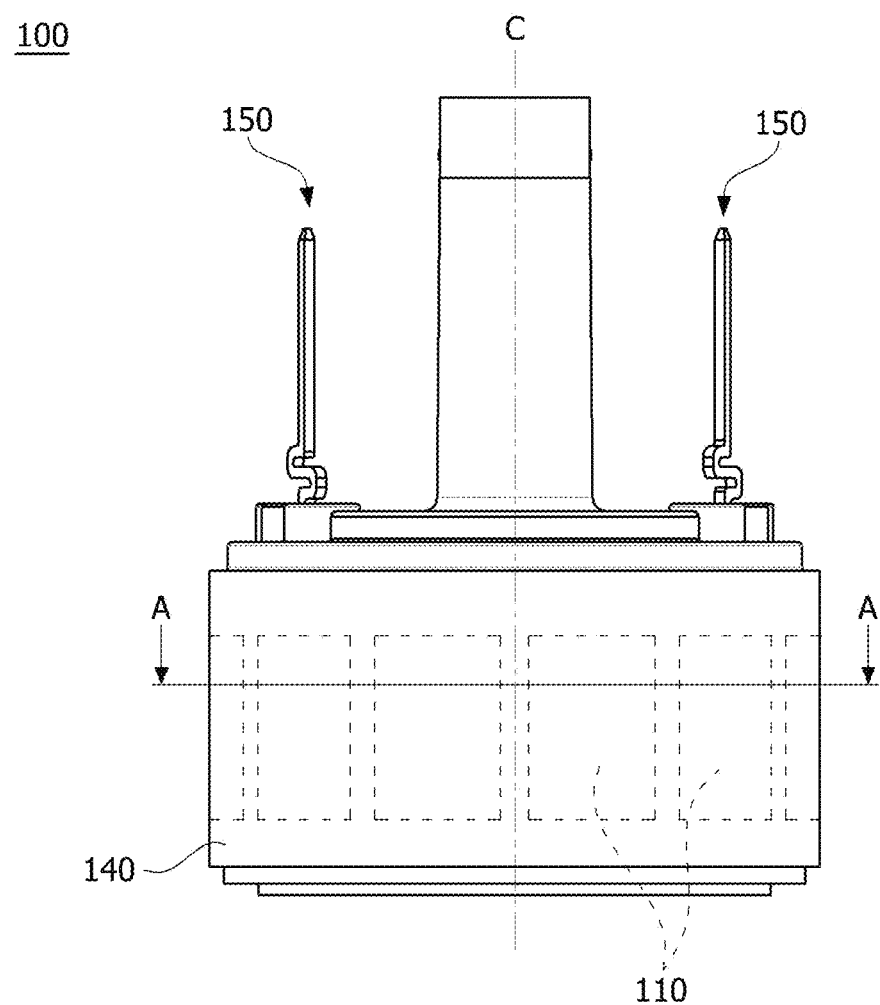
FIG. 3 is a side view illustrating a stator according to an embodiment.
Figure 4:
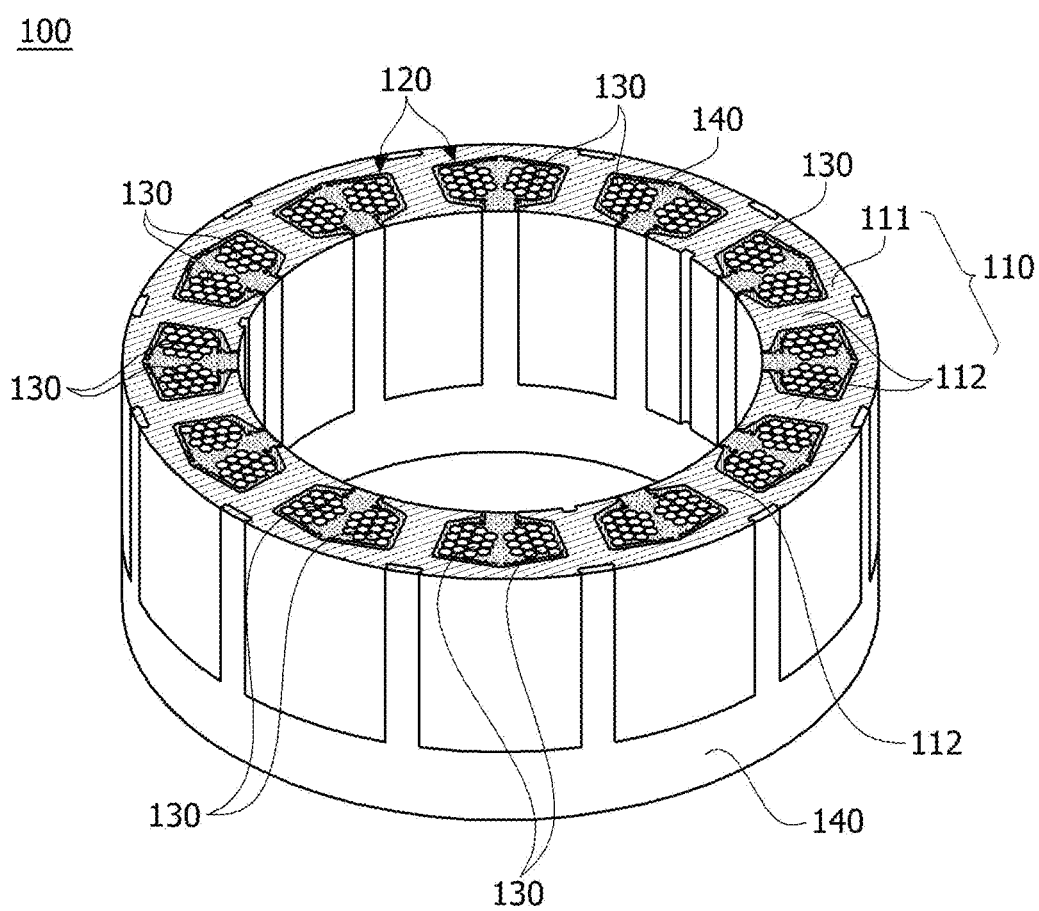
FIG. 4 is a cross-sectional perspective view of the stator taken along line A-A of FIG. 3.
Figure 5:
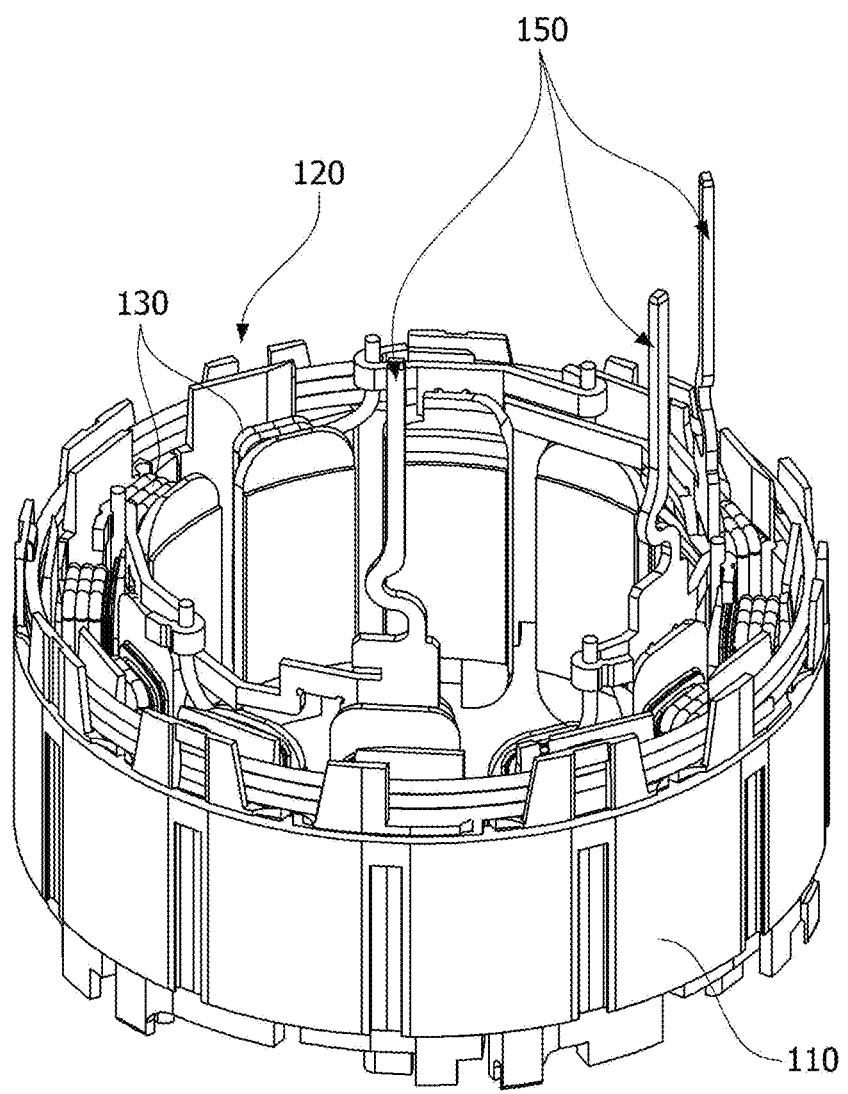
FIG. 5 is a perspective view illustrating a stator from which a molding portion is removed in the stator disposed in a motor according to an embodiment.
Figure 6:
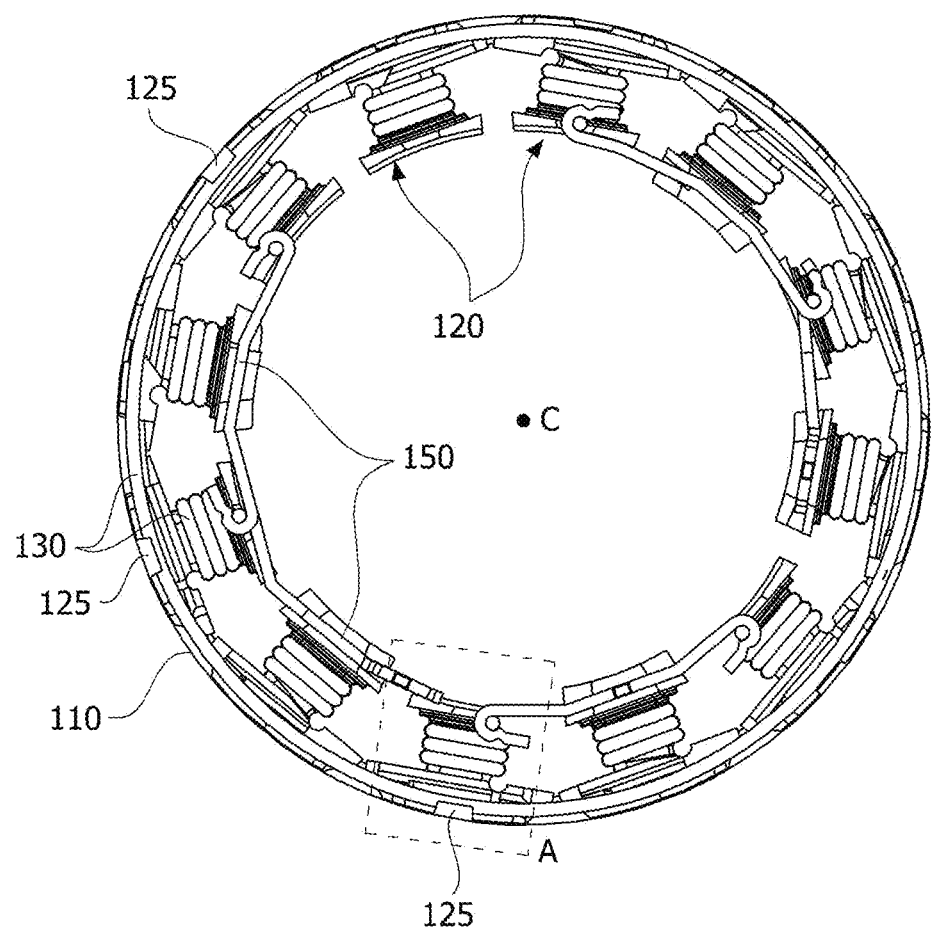
FIG. 6 is a plan view illustrating a stator from which a molding portion is removed in the stator disposed in a motor according to an embodiment.
Figure 7:
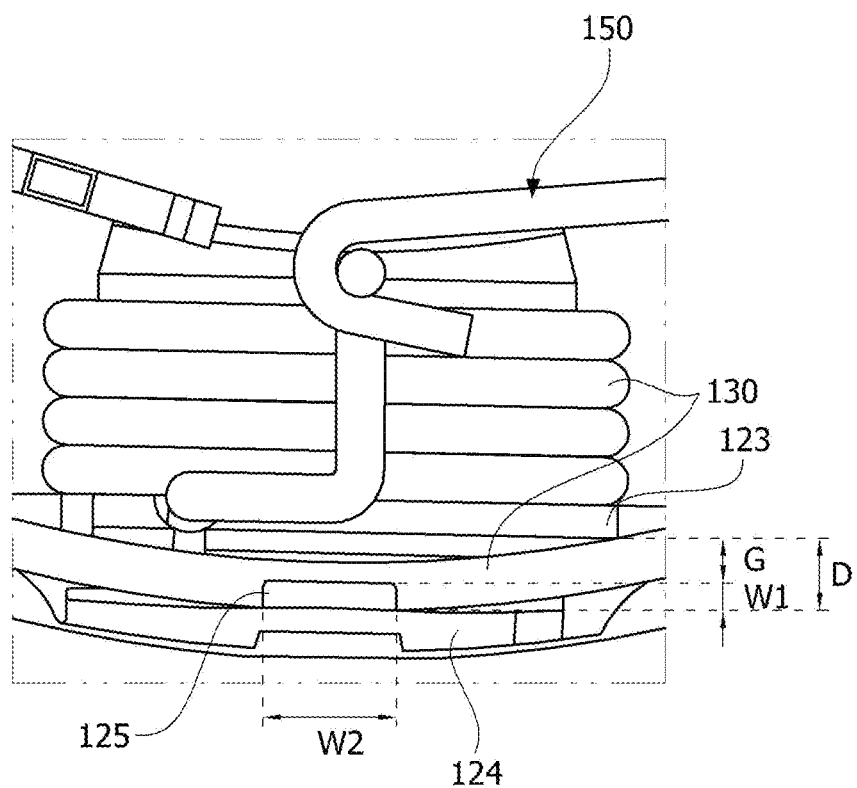
FIG. 7 is an enlarged view of region A of FIG. 6.

FIG. 2 is a perspective view illustrating a stator according to an embodiment, FIG. 3 is a side view illustrating a stator according to an embodiment, FIG. 4 is a cross-sectional perspective view of the stator taken along line A-A of FIG. 3, FIG. 5 is a perspective view illustrating a stator from which a molding portion is removed in the stator disposed in a motor according to an embodiment, FIG. 6 is a plan view illustrating a stator from which a molding portion is removed in the stator disposed in a motor according to an embodiment, and FIG. 7 is an enlarged view of region A of FIG. 6.

Referring to FIGS. 2 through 7, the stator 100 may include a stator core 110, an insulator 120 disposed on the stator core 110, a coil 130 wound around the insulator 120, a molding portion 140 disposed to cover the stator core 110, the insulator 120, and the coil 130, and a terminal 150 electrically connected to an end portion of the coil 130.

Here, the insulator 120 may be primarily injection-molded on the stator core 110 by an injection method. Thus, the insulator 120 may surround a part of the stator core 110. In addition, in a state in which the coil 130 is wound around the insulator 120, the molding portion 140 may be secondarily injection-molded by an injection method. An insert injection method may be used as the injection method.

The stator core 110 may include a yoke 111 having a cylindrical shape and a plurality of teeth 112 that are formed to protrude in the radial direction along the circumferential direction of the yoke 111 based on an imaginary line (axial direction) passing through the center C of the yoke 111. The plurality of teeth 112 may be disposed to face a magnet of the rotor 200.

As shown in FIG. 4, each of the teeth 112 may be disposed on the inner circumferential surface of the yoke 111 toward the center C.

In addition, the teeth 112 may be formed in a T-shaped cross section when viewed from the axial direction, as shown in FIG. 4.

Thus, the teeth 112 may include an L-shaped tooth body and a shoe disposed at an end portion of the tooth body. Here, the shoe may be formed to protrude from the end portion of the tooth body in the circumferential direction with respect to the center C, as shown in FIG. 4.

Meanwhile, the stator core 110 may be formed by stacking a plurality of thin plate-shaped stator plates so that the plurality of teeth 112 may protrude in the radial direction. For example, the stator plates may be formed of a plurality of silicon steel sheets having a thickness of 0.35 to 0.5 mm and formed into a predetermined shape. In addition, the stator core 110 may be formed by stacking the plurality of stator plates.

The insulator 120 may be disposed to surround a region of the stator core 110 by an insert injection method.

The insulator 120 allows the stator core 110 to be insulated from the coil 130. Specifically, the insulator 120 insulates each of the teeth 112 of the stator core 110 from the coil 130. Here, the insulator 120 may be formed of a synthetic resin material.

Figure 8:
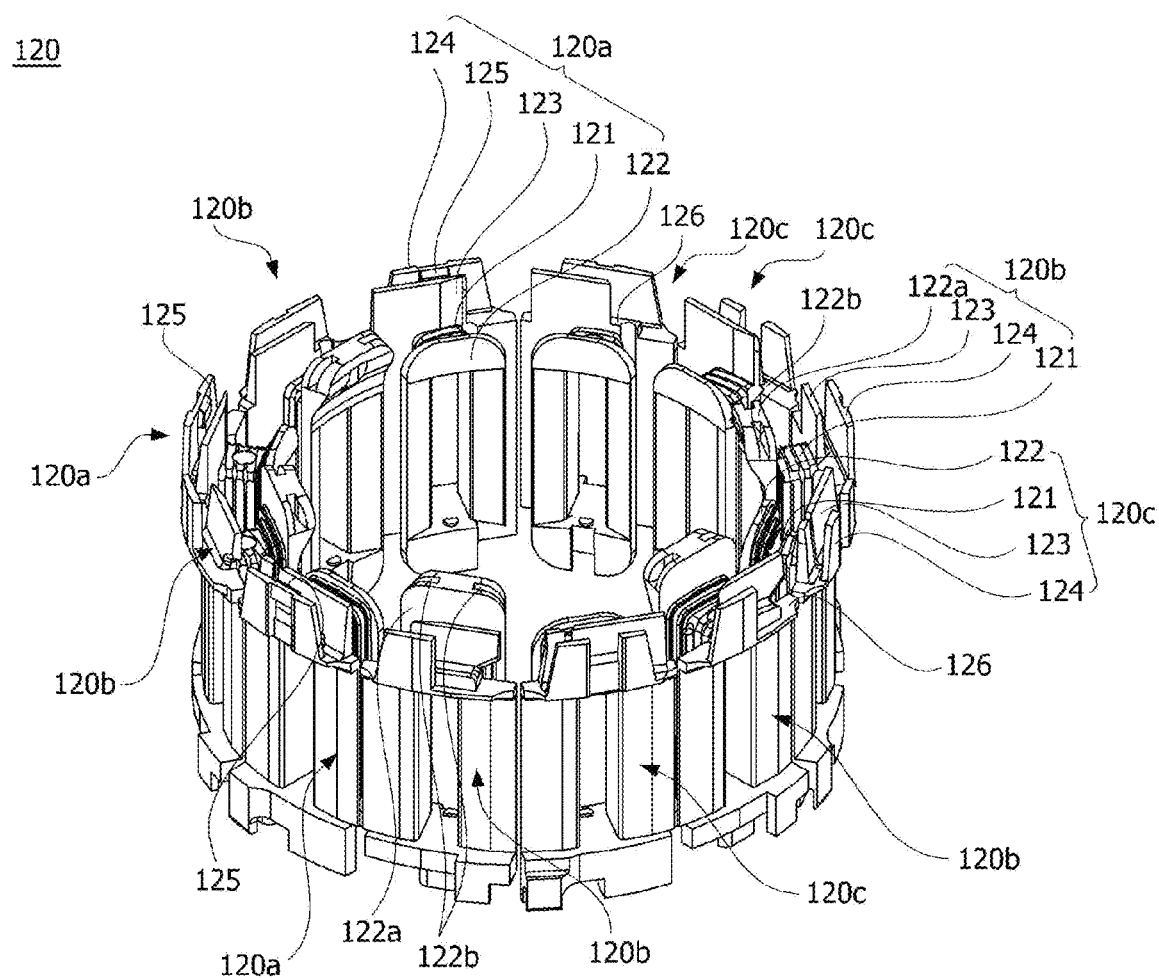
FIG. 8 is a view illustrating an insulator of a stator disposed in a motor according to an embodiment.

FIG. 8 is a view illustrating an insulator of a stator disposed in a motor according to an embodiment.

Referring to FIG. 8, the insulator 120 may include a first insulator 120a, a second insulator 120b, and a third insulator 120c. As shown in FIG. 8, the second insulator 120b may be disposed between the first insulators 120a based on the circumferential direction. In addition, three first insulators 120a may be provided.

Here, the first insulator 120a, the second insulator 120b, and the third insulator 120c may be classified by whether a groove is formed in the upper side of an inner guide and by whether a protrusion is formed on a second outer guide.

Each of the first insulator 120a, the second insulator 120b, and the third insulator 120c includes a body portion 121 around which the coil 130 is wound, an inner guide 122 protruding from the inside of the body portion 121, a first outer guide 123 protruding from the outside of the body portion 121, and a second outer guide 124 disposed to be spaced outward from the first outer guide 123 protruding from the outside of the body portion 121. In this case, the first outer guide 123 and the second outer guide 124 may be disposed to be spaced apart from each other by a predetermined separation distance D. In addition, the separation distance D may be 1.6 to 2.0 times an outer diameter of the coil 130. Here, the outer diameter of the coil 130 may be referred to as a wire diameter or diameter of the coil 130.

In addition, each of the first insulator 120a, the second insulator 120b, and the third insulator 120c may include a connection portion 126 that is disposed between the first outer guide 123 and the second outer guide 124 to connect the first outer guide 123 to the second outer guide 124.

Figure 9:
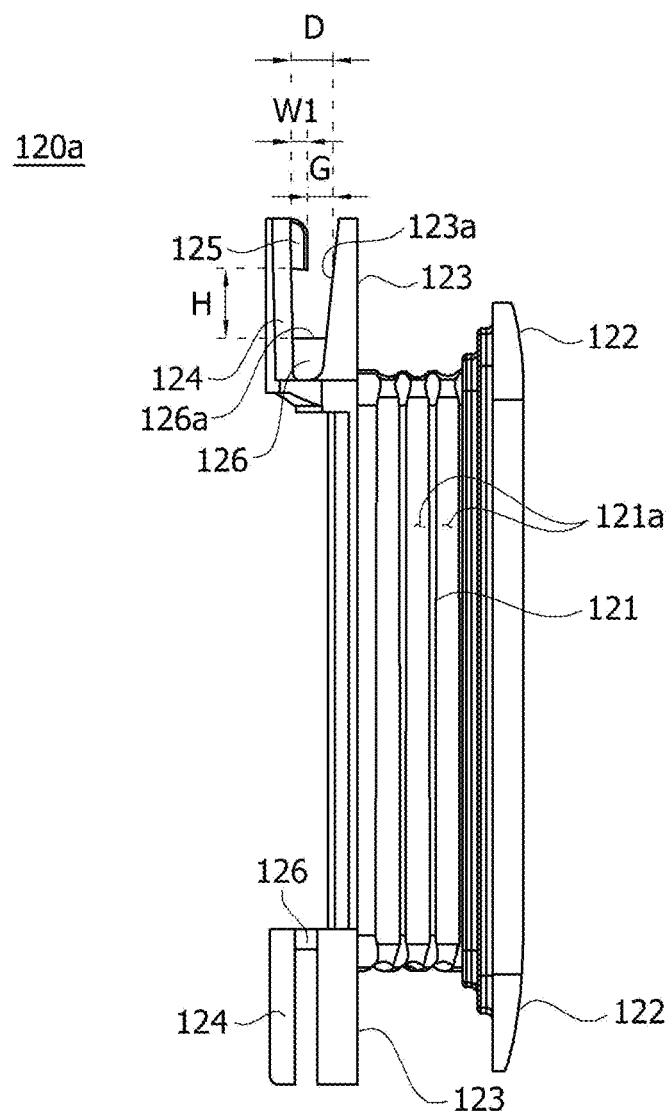
FIG. 9 is a side view illustrating a first insulator of a stator disposed in a motor according to an embodiment.

FIG. 9 is a side view showing a first insulator of a stator disposed in a motor according to an embodiment.

Referring to FIGS. 8 and 9, the first insulator 120a may include a body portion 121, an inner guide 122 protruding from the inside of the body portion 121, a first outer guide 123 protruding from the outside of the body portion 121, a second outer guide 124 disposed to be spaced outward from the first outer guide 123 protruding from the outside of the body portion 121, a protrusion 125 protruding inward from the second outer guide, and a connection portion 126 connecting the first outer guide 123 and the second outer guide 124 to each other.

The body portion 121 may be disposed to surround the teeth body of the teeth 112. In addition, the coil 130 may be wound around the body portion 121. In this case, a guide groove 121a for guiding the winding of the coil 130 may be formed at one side of the body portion 121.

The inner guide 122 may be formed to extend from the inside of the body portion 121 in a direction perpendicular thereto. In this case, the inner guide 122 may be formed to protrude from the inside of the body portion 121 in the axial direction and the circumferential direction.

The inner guide 122 may support the coil 130 wound around the body portion 121 to inhibit the coil 130 from being separated in an inward direction.

The first outer guide 123 may be formed to extend from the outside of the body portion 121 in a direction perpendicular thereto. In this case, the first outer guide 123 may be formed to protrude from the outside of the body portion 121 in the axial direction and the circumferential direction.

The first outer guide 123 may support the coil 130 wound around the body portion 121 to inhibit the coil 130 from being separated in an outward direction.

The first outer guide 123 may be disposed on the top or bottom surface of the yoke 111. Thus, the first outer guide 123 may be disposed to overlap the yoke 311 in the axial direction.

The second outer guide 124 may be disposed to be spaced apart from the first outer guide 123 by a predetermined separation distance D. Here, the second outer guide 124 may be formed to extend from one side of the connection portion 126 in the radial direction in a direction perpendicular thereto. For example, the second outer guide 124 may be formed to protrude from the outside of the connection portion 126 in the axial direction.

As shown in FIGS. 6 and 7, a region of the coil 130 wound in the circumferential direction may be disposed between the first outer guide 123 and the second outer guide 124. In addition, the second outer guide 124 inhibits the coil 130 from being exposed in the radial direction by the injection pressure generated when secondary injection for forming the molding portion 140 using a mold material is performed.

Meanwhile, the second outer guide 124 may be disposed on the top or bottom surface of the yoke 111. Thus, the second outer guide 124 may be disposed to overlap the yoke 311 in the axial direction.

The protrusion 125 may inhibit a part of the coil 130 disposed between the first outer guide 123 and the second outer guide 124 from being separated in the axial direction by the injection pressure.

Referring to FIGS. 6, 7 and 9, the protrusion 125 may be formed to protrude inward from the top of the second outer guide 124. In this case, the end portion of the protrusion 125 may be disposed such that a predetermined gap G may be formed between the end portion and the outer surface 123a of the first outer guide 123 based on the radial direction. Thus, the coil 130 may be inserted into the gap G between the first outer guide 123 and the second outer guide 124. In this case, the gap G may be slightly greater than or equal to the outer diameter of the coil 130. Here, the outer surface 123a of the first outer guide 123 may be formed to have an inclined surface having a predetermined inclination angle with respect to the connection portion 126.

Furthermore, the end portion of the protrusion 125 may be rounded. For example, the top surface of the end portion of the protrusion 125 may be formed as a curved surface so that the coil 130 may be inserted between the first outer guide 123 and the second outer guide 124. Thus, the coil 130 may be easily inserted between the first outer guide 123 and the second outer guide 124 through the outer surface 123a of the first outer guide 123 formed to be inclined with the curved surface.

Referring to FIGS. 7 and 9, a width W1 of the protrusion 125 in the radial direction may be 0.6 times or more of the outer diameter of the coil 130. Even in this case, the width W1 is formed in consideration of the gap G.

Referring to FIG. 7, a width W2 of the protrusion 125 in the circumferential direction may be twice or more of the outer diameter of the coil 130. In this case, the width W2 of the protrusion 125 in the circumferential direction is less than the width of the second outer guide 124 in the circumferential direction. Thus, cracks do not occur due to the force by which the coil 130 is pushed in the axial direction by the injection pressure.

Referring to FIGS. 7 and 9, the protrusion 125 may be formed to have a predetermined height H based on a top surface 126a of the connection portion 126. In this case, the height H may be three times or more of the outer diameter of the coil 130. However, the height H is less than the height of the second outer guide 124 in the axial direction.

The connection portion 126 may be disposed on the first outer guide 123 and the second outer guide 124 to connect the first outer guide 123 and the second outer guide 124.

The connection portion 126 may be disposed on the yoke 111. In addition, the coil 130 may be disposed on the connection portion 126. Thus, the connection portion 126 allows the yoke 111 to be insulated from the coil 130.

Referring to FIG. 8, the second insulator 120b includes a body portion 121, an inner guide 122a protruding from the inside of the body portion 121, and a first outer guide 123 protruding from the outside of the body portion 121, a second outer guide 124 disposed to be spaced apart from the first outer guide 123 in the outward direction, and a connection portion 126 connecting the first outer guide 123 and the second outer guide 124.

When comparing the second insulator 120b with the first insulator 120a, in the case of the second insulator 120b, there is a difference in that the protrusion 125 is removed and in the shape of the inner guide 122a.

In describing the second insulator 120b and the first insulator 120a, the same component as the first insulator 120a is denoted by the same reference numeral, and a detailed description thereof will be omitted.

The inner guide 122a of the second insulator 120b may include a groove 122b formed for coupling with the terminal 150. The groove 122b may be formed in an end portion of the inner guide 122a. As shown in FIG. 8, the groove 122b may be formed in an upper end of the inner guide 122a. Thus, one side of the terminal 150 may be coupled to the groove 122b.

Referring to FIG. 8, the third insulator 120c includes a body portion 121, an inner guide 122 protruding from the inside of the body portion 121, a first outer guide 123 protruding from the outside of the body portion 121, a second outer guide 124 disposed to be spaced outward from the first outer guide 123 protruding from the outside of the body portion 121, and a connection portion 126 connecting the first outer guide 123 and the second outer guide 124.

When comparing the third insulator 120c with the first insulator 120a, there is a difference in that the third insulator 120c is formed by removing the protrusion 125 of the first insulator 120a.

Thus, the insulator 120 of the motor 1 may be formed by arranging the first insulator 120a, the second insulator 120b, and the third insulator 120c in the circumferential direction. In this case, the second insulator 120b is disposed between the first insulators 120a based on the circumferential direction in consideration of electrical connection between the end portion of the coil 130 and the terminal 150.

The coil 130 may be wound around the body portion 121. In this case, the arrangement of the coil 130 may be guided by the guide groove 121a of the body portion 121. In addition, the end portion of the coil 130 disposed on the body portion 121 may be electrically connected to the terminal 150.

Furthermore, the coil 130 may be wound and disposed between the first outer guide 123 and the second outer guide 124.

The molding portion 140 may be disposed to cover the stator core 110, the insulator 120, and the coil 130. In particular, the molding portion 140 may be disposed between the coil 130 and the coil 130 wound around each of the body portions 121. Thus, the two coils 130 disposed to be spaced apart from each other may be insulated by the molding portion 140.

In the injection process of the stator, the stator core 110 having a plurality of teeth 112 formed thereon may be disposed in a mold (not shown), and the insulator 120 may be formed through an insert injection method. Here, the insulator 120 may be formed of any one of a resin, synthetic resin, rubber, and urethane.

In particular, in the case of the deployable stator core 110, the coil 130 may be wound after the insulator 120 is formed in a state in which the stator core 110 is deployed.

Also, the coil 130 may be wound around the stator core 110 in which the insulator 120 is injection-molded.

In particular, in the case of a deployable stator core 110, the coil 130 may be wound after the insulator 120 is formed in a state in which the stator core 110 is deployed. Then, one side and the other side of the deployable stator core 110 may be brought into contact with each other through a rolling process and then welded to form a cylindrical shape.

In addition, a molding portion 140 may be injection-molded on the stator core 110 around which the coil 130 is wound after the rolling process is completed. For example, the stator core 110 around which the coil 130 is wound may be disposed in a mold (not shown), and the molding portion 140 may be formed through an insert injection method. Here, the molding portion 140 may be formed of any one of a resin, synthetic resin, rubber, and urethane.

That is, in the stator 100, the insulator 120 may be primarily formed by injection, then, the coil 130 may be wound, and the molding portion 140 may be secondarily formed by an injection method.

In this case, during injection molding of the molding portion 140, even when an injection pressure is applied to the coil 130, the coil 130 may be inhibited from being exposed to the outside by the second outer guide 124 and the protrusion 125.

The terminal 150 may be disposed to be electrically connected to one end of the coil 130. Thus, a current may be applied to the coil 130 through the terminal 150 partially exposed to the outside. Thus, as a current flows through the coil 130, a rotating magnetic field is formed between the stator 100 and the rotor 200, and thus, the rotor 200 rotates.

Figure 10:
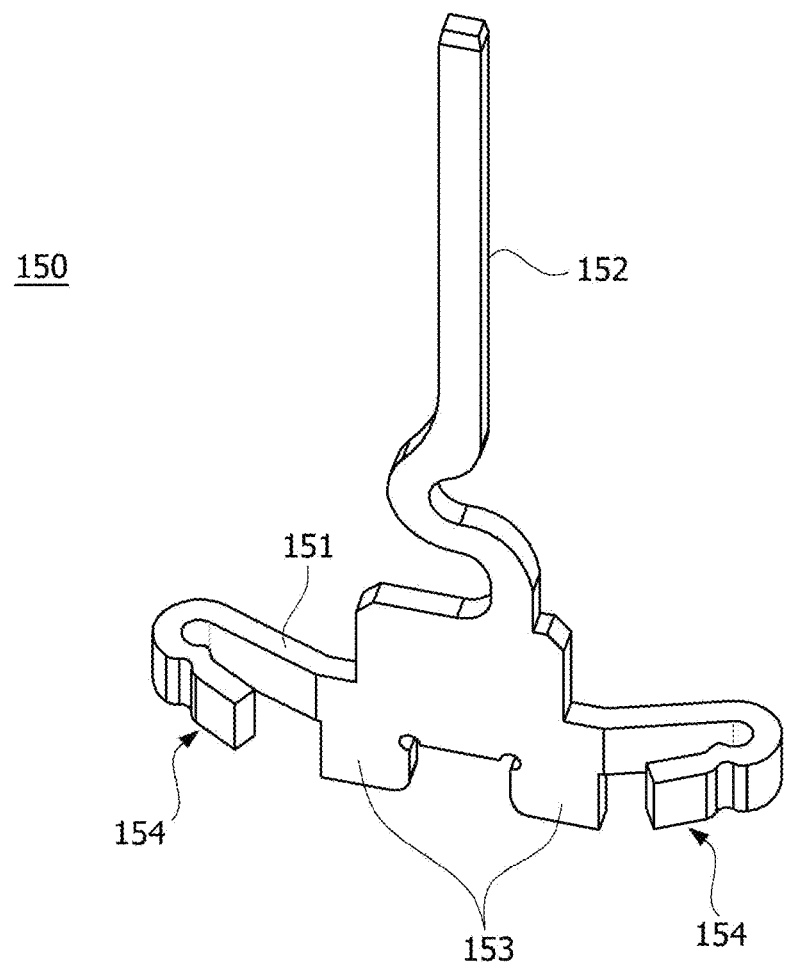
FIG. 10 is a view illustrating a terminal of a stator disposed in a motor according to an embodiment.

FIG. 10 is a view illustrating a terminal of a stator disposed in a motor according to an embodiment.

Referring to FIG. 10, the terminal 150 includes a terminal body 151, a pin portion 152 protruding from the top surface of the terminal body 151 in the axial direction, and a projection portion 153 protruding from the bottom surface of the terminal body 151 in the axial direction, and a bent portion 154 formed by bending each of both sides of the terminal body 151. In addition, the projection portion 153 may be coupled to the groove 122b. Also, since the end portion of the coil 130 is disposed in the bent portion 154, the terminal 150 may be electrically connected to the coil 130. In addition, a part of the pin portion 152 may be exposed to the outside and electrically connected to an external power supply (not shown) that applies an external current.

The rotor 200 may be disposed inside the stator 100.

The rotor 200 may be configured by coupling a magnet (not shown) to a rotor core (not shown). For example, the magnet may be inserted into a pocket provided in the rotor core.

Alternatively, the rotor 200 may be formed by attaching the magnet to the outer peripheral surface of the rotor core.

The rotor 200 may rotate in combination with the shaft 300. For example, the shaft 300 may be coupled to the central portion of the rotor 200.

In addition, a bearing 10 may be disposed on an outer peripheral surface of the shaft 300. Thus, the bearing 10 may be rotatably supported by the shaft 300.

The housing 400 may form the outer shape of the motor 1 and determine the size of the motor 1.

In addition, the housing 400 may accommodate the stator 100 and the rotor 200. That is, as shown in FIG. 1, the stator 100 and the rotor 200 may be disposed inside the housing 400.

While the present invention has been shown and described with reference to the exemplary embodiments thereof, it will be understood by those skilled in the art that various changes in form and details may be made therein without departing from the spirit and scope of the invention as defined by the scope of the appended claims.

EXPLANATION OF REFERENCE NUMERALS

1: motor, 100: stator, 110: stator core, 111: yoke, 112: tooth, 120: insulator, 121: body portion, 122: inner guide, 122b: groove, 123: first outer guide, 124: second outer guide, 125: protrusion, 130: coil, 140: molding portion, 150: terminal, 200: rotor, 300: shaft, 400: housing

The invention claimed is:

1. A stator comprising:
a stator core comprising a yoke and a plurality of teeth protruding from an inner surface of the yoke;
an insulator group surrounding a part of the stator core;
a coil wound around the insulator group; and
a molding portion disposed to cover the stator core, the insulator group, and the coil,
wherein the insulator group comprises at least one first insulator and a second insulator,
the at least one first insulator comprises:
a body portion around which the coil is wound;
an inner guide extending from an inside of the body portion in a direction perpendicular thereto;
a first outer guide extending from an outside of the body portion in a direction perpendicular thereto, having a planar inner lateral surface that is entirely inclined at a predetermined angle with respect to a top surface of the body portion;
a second outer guide disposed to be spaced apart from the first outer guide in an outward direction; and
a protrusion protruding inward from the second outer guide,
wherein an end portion of the protrusion is disposed such that a predetermined gap (G) is formed between the end portion and the first outer guide, and
wherein a part of the coil is disposed between the first outer guide and the second outer guide through the gap (G).

2. The stator of claim 1, wherein a width (W1) of the protrusion in a radial direction is 0.6 times or more of an outer diameter of the coil.

3. The stator of claim 2, wherein a width (W2) of the protrusion in a circumferential direction is twice or more of the outer diameter of the coil.

4. The stator of claim 3, wherein the insulator group comprises a connection portion disposed between the first outer guide and the second outer guide,
wherein the connection portion is disposed on the yoke, and
a height (H) from the connection portion to the protrusion is three times or more of the outer diameter of the coil.

5. The stator of claim 1, comprising a terminal connected to an end portion of the coil,
wherein the second insulator comprises:
a body portion around which the coil is wound;
a first outer guide extending from an outside of the body portion in a direction perpendicular thereto;
a second outer guide disposed to be spaced apart from the first outer guide in an outward direction; and an inner guide extending from an inside of the body portion in a direction perpendicular thereto, and a groove to which one side of the terminal is coupled is formed in an upper end of the inner guide.

6. The stator of claim 5, wherein the terminal comprises:
a terminal body;
a pin portion protruding from a top surface of the terminal body;
a projection portion protruding from a bottom surface of the terminal body; and
a bent portion formed by bending each of both sides of the terminal body, and
the projection portion is coupled to the groove.

7. The stator of claim 1, wherein the at least one first insulator comprises three first insulators and the second insulator is disposed between two adjacent first insulators of the three first insulators with respect to a circumferential direction.

8. The stator of claim 1, wherein the insulator group is disposed on the stator core by an injection method.

9. The stator of claim 8, wherein the molding portion is formed by an injection method in a state in which the coil is wound around the insulator group.

10. A motor comprising:
a shaft;
a rotor that rotates in combination with the shaft; and
a stator disposed outside the rotor,
wherein the stator comprises:
a stator core;
an insulator group surrounding a part of the stator core;
a coil wound around the insulator group; and
a molding portion disposed to cover the stator core, the insulator group, and the coil,
wherein the insulator group comprises a first insulator and a second insulator,
wherein the first insulator comprises:
a body portion around which the coil is wound;
an inner guide extending from an inside of the body portion in a direction perpendicular thereto;
a first outer guide extending from an outside of the body portion in a direction perpendicular thereto, having a planar inner lateral surface that is entirely inclined at a predetermined angle with respect to a top surface of the body portion;
a second outer guide disposed to be spaced apart from the first outer guide in an outward direction; and
a protrusion protruding inward from the second outer guide,
wherein an end portion of the protrusion is disposed such that a predetermined gap (G) is formed between the end portion and the first outer guide, and
wherein a part of the coil is disposed between the first outer guide and the second outer guide through the gap (G).

11. The motor of claim 10, wherein, after the insulator group is primarily formed on the stator core by an injection method, the molding portion is secondarily formed by an injection method in a state in which the coil is wound around the insulator group.

* * * * *